US012659216B2

(12) United States Patent　　　　(10) Patent No.:　US 12,659,216 B2
Rafati et al.　　　　　　　　　　　　(45) Date of Patent:　　Jun. 16, 2026

(54) METHOD AND APPARATUS FOR COMMUNICATION OF SIGNALS

(71) Applicant: QUANTUMSINE OPERATING Pte Ltd, Singapore (SG)

(72) Inventors: Sina Rafati, Santa Ana, CA (US); Kenneth A. Hansen, Georgetown, TX (US); John George Caras, Austin, TX (US)

(73) Assignee: QuantumSine Operating Pte Ltd., Singapore (SG)

( * ) Notice: Subject to any disclaimer, the term of this patent is extended or adjusted under 35 U.S.C. 154(b) by 0 days.

(21) Appl. No.: 18/819,924

(22) Filed: Aug. 29, 2024

(65) Prior Publication Data

US 2026/0067151 A1　　Mar. 5, 2026

(51) Int. Cl.
　H04L 27/34　　　(2006.01)
　H04L 27/36　　　(2006.01)
　H04L 27/38　　　(2006.01)
(52) U.S. Cl.
　CPC ...... H04L 27/3483 (2013.01); H04L 27/3405 (2013.01); H04L 27/367 (2013.01); H04L 27/38 (2013.01)
(58) Field of Classification Search
　CPC ............. H04L 27/3483; H04L 27/3405; H04L 27/367; H04L 27/38
　See application file for complete search history.

(56) References Cited

U.S. PATENT DOCUMENTS

| | | | |
|---|---|---|---|
| 10,396,899 B1 * | 8/2019 | Kim ...................... | H04B 10/541 |
| 11,070,410 B1 * | 7/2021 | Ait Aoudia .............. | G06N 3/08 |
| 2021/0377086 A1 * | 12/2021 | Hussein .............. | H04L 27/2064 |
| 2023/0231755 A1 * | 7/2023 | Stadelmeier ............ | H04L 27/34 |
| | | | 375/261 |
| 2024/0356793 A1 * | 10/2024 | Shi .......................... | H04L 27/34 |

FOREIGN PATENT DOCUMENTS

WO　　WO-2023031632 A1 *　3/2023　........... G06N 3/0455

* cited by examiner

*Primary Examiner* — Freshteh N Aghdam
(74) *Attorney, Agent, or Firm* — Ross D. Snyder

(57)　　　　　ABSTRACT

A method and apparatus comprising a neural-network-based encoder, a neural-network-based decoder, or both, are provided. In accordance with one embodiment, a method comprises mapping, in a first artificial neural network, a plurality of data values to a plurality of constellation points; adding noise to the constellation points to obtain a plurality of noise-added constellation points; mapping, in a second artificial neural network, the plurality of noise-added constellation points to a plurality of data value representations; and applying the plurality of data value representations to perform a communication operation selected from a group consisting of modulating transmit data in a transmitter and demodulating a receive signal in a receiver.

7 Claims, 10 Drawing Sheets

METHOD AND APPARATUS FOR COMMUNICATION OF SIGNALS

BACKGROUND

Field of the Disclosure

The present application relates to communication systems, devices, and methods, and, more particularly, to methods and apparatuses for modulation and demodulation of signals.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

A method and apparatus comprising a neural-network-based encoder, a neural-network-based decoder, or both, are provided. In accordance with one embodiment, a method comprises mapping, in a first artificial neural network, a plurality of data values to a plurality of constellation points; adding noise to the constellation points to obtain a plurality of noise-added constellation points; mapping, in a second artificial neural network, the plurality of noise-added constellation points to a plurality of data value representations; and applying the plurality of data value representations to perform a communication operation selected from a group consisting of modulating transmit data in a transmitter and demodulating a receive signal in a receiver.

Figure 1:
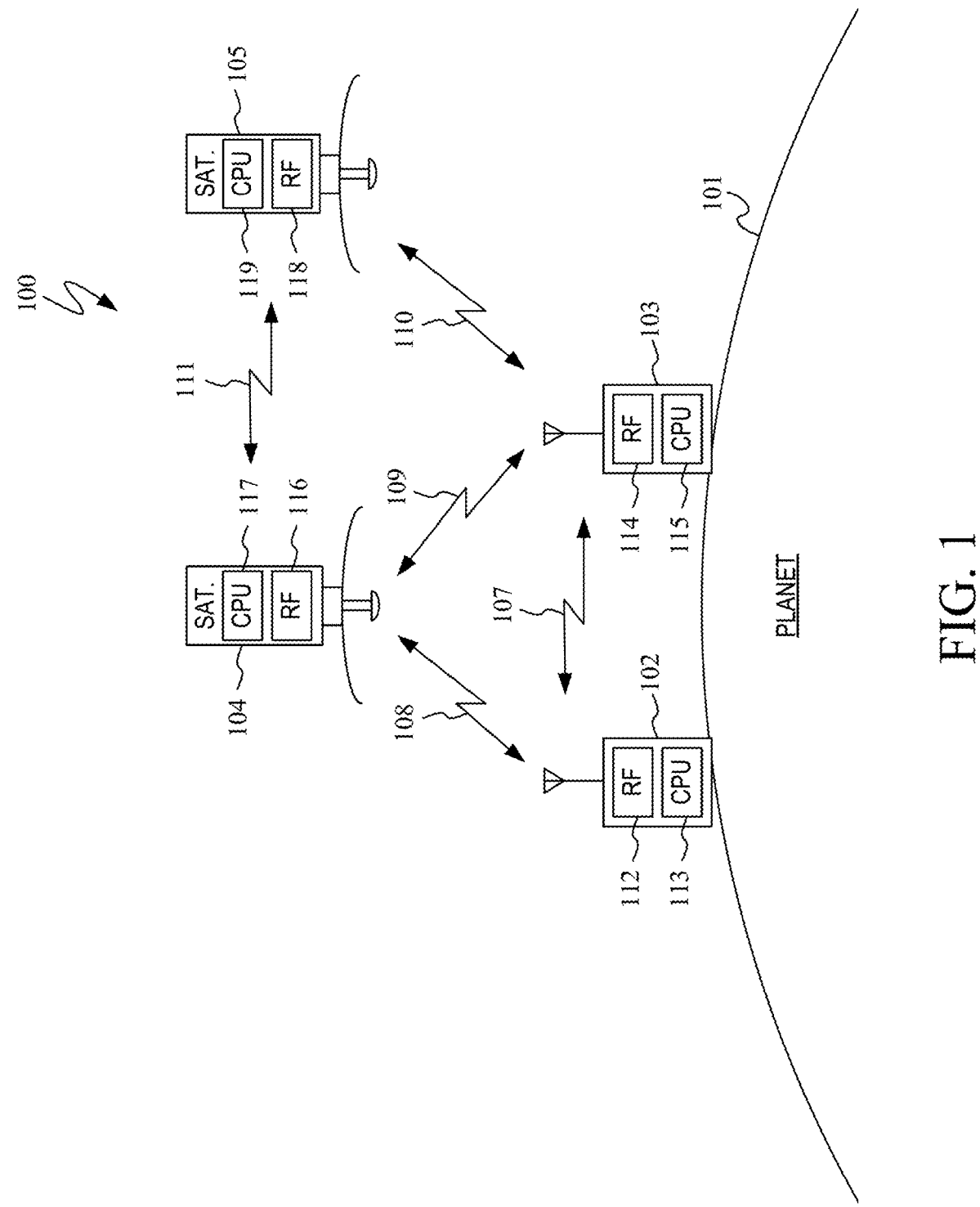
FIG. 1 is a block diagram illustrating an example of a network of devices implementing a communications system in accordance with at least one embodiment.

FIG. 1 is a block diagram illustrating an example of a network of devices implementing a communications system 100 in accordance with at least one embodiment. A communication system as disclosed herein may be used for communication between a plurality of devices, such as stations. As examples, such devices may be on or near a planet 101, such as the earth, or may be in space. Examples of such devices include apparatus 102, apparatus 103, apparatus 104, and apparatus 105. As examples, apparatus 102 and apparatus 103 are located on or near a surface of planet 101. As examples, apparatus 104 and 105 are located in space, e.g., as satellites. Apparatus 102 comprises radio subsystem 112 and processor subsystem 113. Apparatus 103 comprises radio subsystem 114 and processor subsystem 115. Apparatus 104 comprises radio subsystem 116 and processor subsystem 117. Apparatus 105 comprises radio subsystem 118 and processor subsystem 119. For brevity and convenience, the radio subsystems bear the exemplary label RF for radio frequency, and the processor subsystems bear the exemplary label CPU for central processing unit.

As shown, terrestrial apparatus can communicate with other terrestrial apparatus, with non-terrestrial apparatus, or with both. Non-terrestrial apparatus can communicate with other non-terrestrial apparatus, with terrestrial apparatus, or with both. As an example, apparatus 102 can communicate with apparatus 103 via communication path 107. As an example, apparatus 102 can communicate with apparatus 104 via communication path 108. As an example, apparatus 103 can communicate with apparatus 104 via communication path 109. As an example, apparatus 103 can communicate with apparatus 105 via communication path 110. As an example, apparatus 104 can communicate with apparatus 105 via communication path 111.

Figure 2:
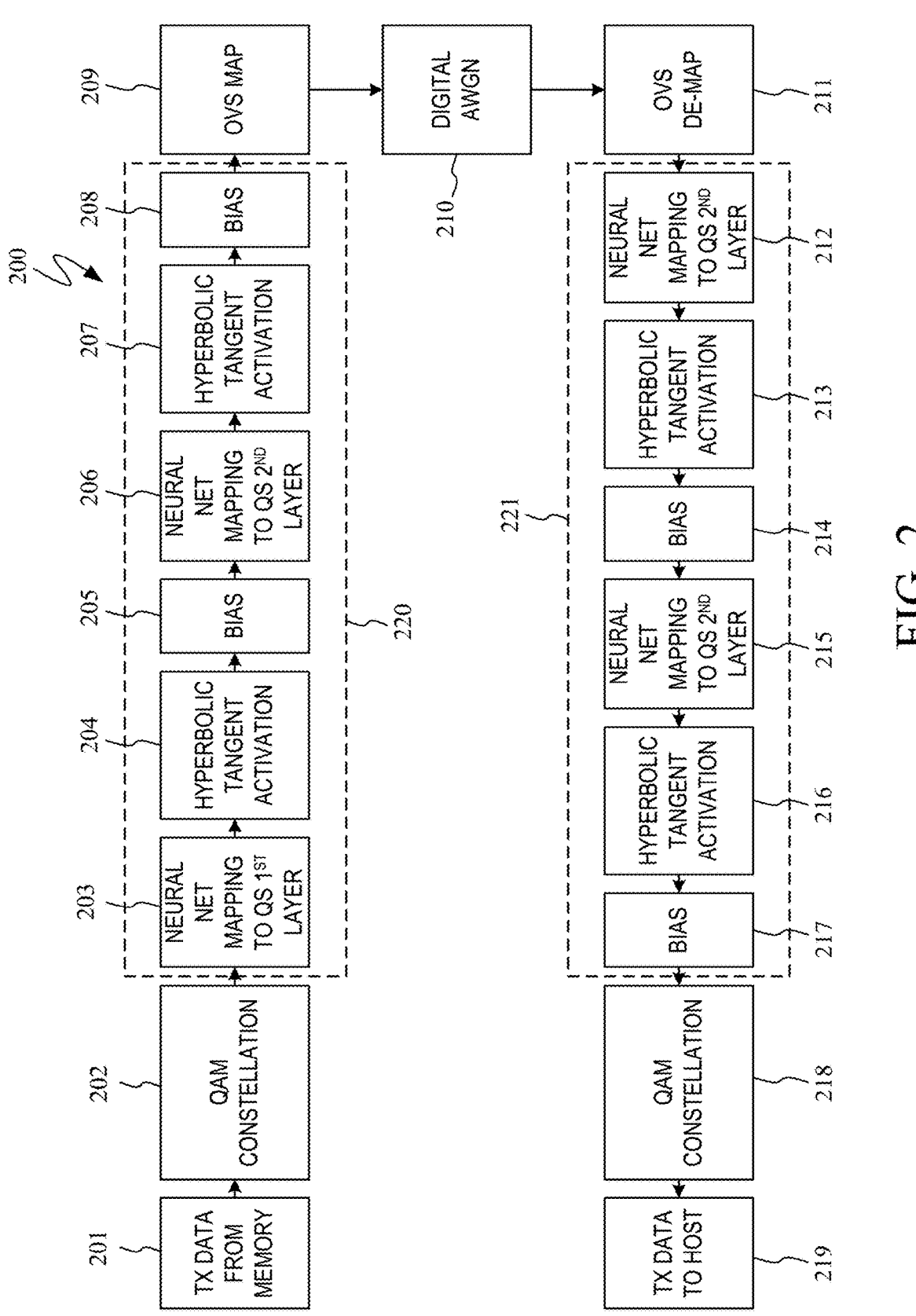
FIG. 2 is a block diagram illustrating an example of a communication system in accordance with at least one embodiment.

FIG. 2 is a block diagram illustrating an example of a communication system in accordance with at least one embodiment. For example, communication system 200 may be implemented with respect to devices, such as apparatus 102, apparatus 103, apparatus 104, or apparatus 105 of FIG. 1 or with respect to other devices. Communication system 200 comprises data input 201, quadrature-amplitude modulator 202, neural-network based encoder 220, orthonormal vector set (OVS) mapper 209, noise adder 210, OVS demapper 211, neural-network-based decoder 221, quadrature-amplitude demodulator 218, and data output 219. Data input 201 is configured to receive transmit (TX) data (data to be transmitted). As examples, data input 201 can receive transmit data from memory or from another source. Quadrature-amplitude modulator 202 is configured to receive transmit data from data input 201 and to modulate data values of the data as constellation points of a constellation on a complex plane. As an example, the constellation points may be defined according to regularly spaced in-phase (I) coordinate values and regularly spaced quadrature (Q) coordinate values. A particular constellation point may have an I coordinate value selected from the I coordinate values and a Q coordinate value selected from the Q coordinate values.

Neural-network-based encoder 220 is configured to receive quadrature-amplitude-modulation (QAM) constellation points from quadrature-amplitude modulator 202 and to provide modified constellation points to OVS mapper 209. Neural-network-based encoder 220 comprises mapper 203, activation layer 204, bias layer 205, mapper 206, activation layer 207, and bias layer 208. Mapper 203 is configured to receive QAM constellation points from quadrature-amplitude modulator 202 at to map the QAM constellation point values to a first set of mapped values. Activation layer 204 is configured to apply an activation function to the first set of mapped values and to provide a first probability distribution of possible outcomes based on the first set of mapped values. As an example, activation layer 204 can apply a hyperbolic tangent activation function. As an example, activation layer 204 can apply a softmax activation function. Bias layer 205 is configured to receive the first probability distribution and to provide a bias-corrected first probability distribution. Mapper 206 is configured to receive the bias-corrected first probability distribution and to map the bias-corrected first probability distribution to a second set of mapped values. Activation layer 207 is configured to apply an activation function to the second set of mapped values and to provide a second probability distribution of possible outcomes based on the second set of mapped values. As an example, activation layer 207 can apply a hyperbolic tangent activation function. As an example, activation layer 207 can apply a softmax activation function. Bias layer 208 is configured to receive the second probability distribution and to provide a bias-corrected second probability distribution.

OVS mapper 209 is configured to receive the output of neural-network-based encoder 220 and to map the output to an orthonormal vector set, providing information for a transmit signal at the output of a transmitter. Noise adder 210 is configured to add noise to the transmit signal. As an example, noise adder 210 can add additive Gaussian white noise (AGWN), for example, a digital representation of AGWN, to the transmit signal. The noise can be representative of channel noise that may be experienced along an actual communication path, such communication paths 108, 109, 110, or 111 of FIG. 1. OVS de-mapper 211 is configured to receive the noise-added transmit signal as a receive signal and to de-map the orthonormal vector set to provide receive modified constellation points.

Neural-network-based decoder 221 is configured to receive the receive modified constellation points and to provide receive QAM constellation points. Neural-network-based decoder 221 comprises mapper 212, activation layer 213, bias layer 214, mapper 215, activation layer 216, and bias layer 217. Mapper 212 is configured to receive the receive modified constellation points and to map the receive modified constellation points to a receive first set of mapped values. Activation layer 213 is configured to receive the first set of mapped values and to apply an activation function to the receive first set of mapped values and to provide a receive first probability distribution of possible outcomes based on the receive first set of mapped values. As an example, activation layer 213 can apply a hyperbolic tangent activation function. As an example, activation layer 213 can apply a softmax activation function. Bias layer 214 is configured to receive the receive first probability distribution and to provide a receive bias-corrected first probability distribution. Mapper 215 is configured to receive the receive bias-corrected first probability distribution and to map the receive bias-corrected first probability distribution to a receive second set of mapped values. Activation layer 216 is configured to apply an activation function to the receive second set of mapped values and to provide a receive second probability distribution of possible outcomes based on the receive second set of mapped values. As an example, activation layer 216 can apply a hyperbolic tangent activation function. As an example, activation layer 216 can apply a softmax activation function. Bias layer 217 is configured to receive the receive second probability distribution and to provide a receive bias-corrected second probability distribution.

Quadrature-amplitude demodulator 218 is configured to receive decoded values from neural-network-based decoder 221 and to demodulate the decoded values to provide receive data. As an example, quadrature-amplitude demodulator 218 is configured to receive the receive bias-corrected second probability distribution from neural-network-based decoder 221. As an example, the output of neural-network-based decoder 221 may be QAM constellation points. Quadrature-amplitude demodulator 218 can demodulate the QAM constellation points to obtain the receive data.

Figure 3:
FIG. 3 is a graph illustrating an example of constellation points in accordance with at least one embodiment.
Figure 3:
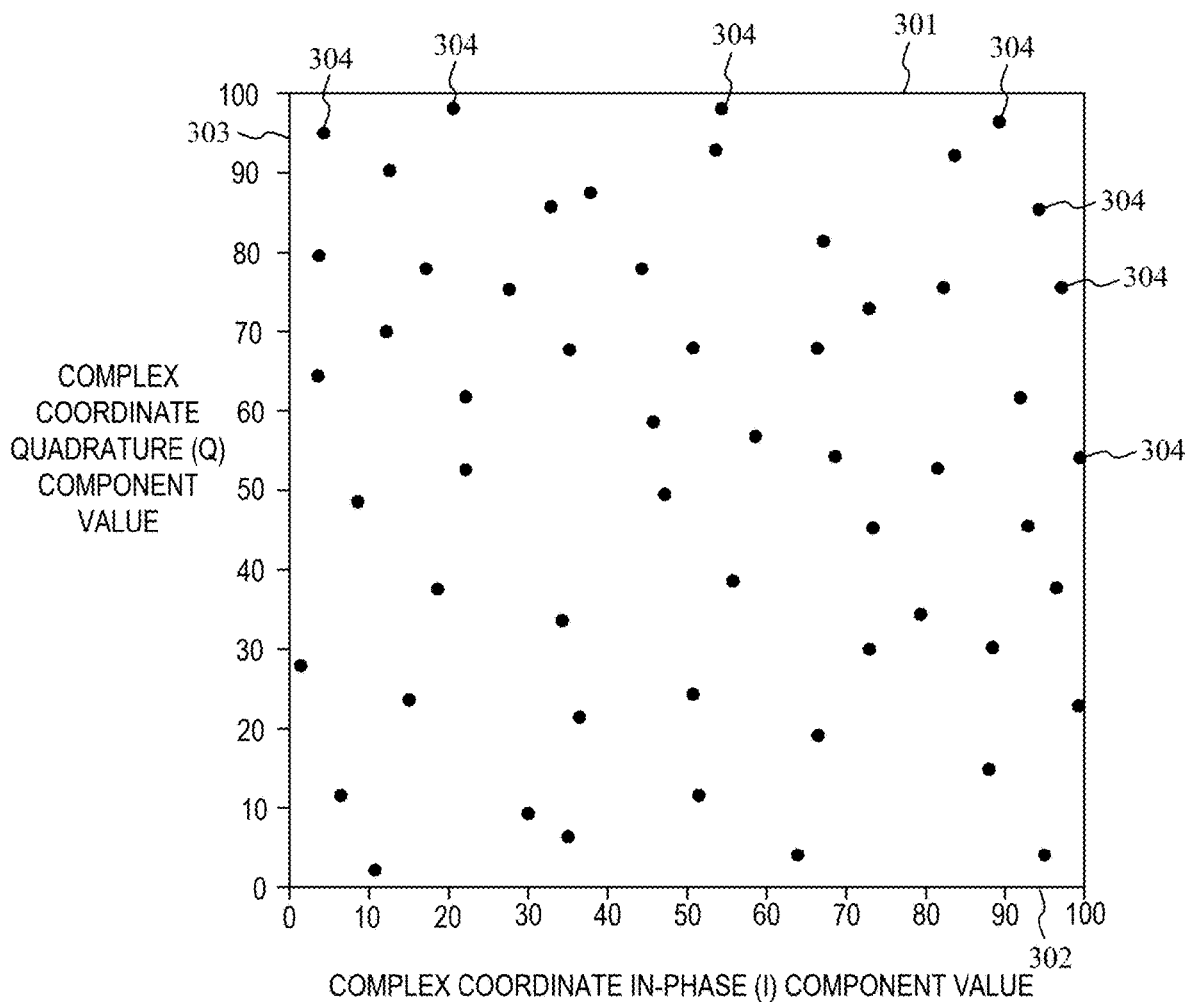

FIG. 3 is a graph illustrating an example of constellation points in accordance with at least one embodiment. Graph 300 shows complex plane 301 having an in-phase (I) axis 302 and a quadrature (Q) axis 303. Constellation points 304 are located at various I and Q coordinates in complex plane 301. Training of neural-network-based encoder 220 can begin with constellation points that need not correlate to desired properties of constellation points of a modulation technique. As an example, training of neural-network-based encoder 220 can begin with constellation points that do not provide reliable demodulation of a receive signal altered by channel noise. For example, constellation points can be chosen initially at random. As another example, constellation points can be chosen initially at arbitrary locations in the complex plane. As training occurs, the locations of the constellation points can be improved to provide desired properties, such as reliable communication in the presence of channel noise.

Figure 4:
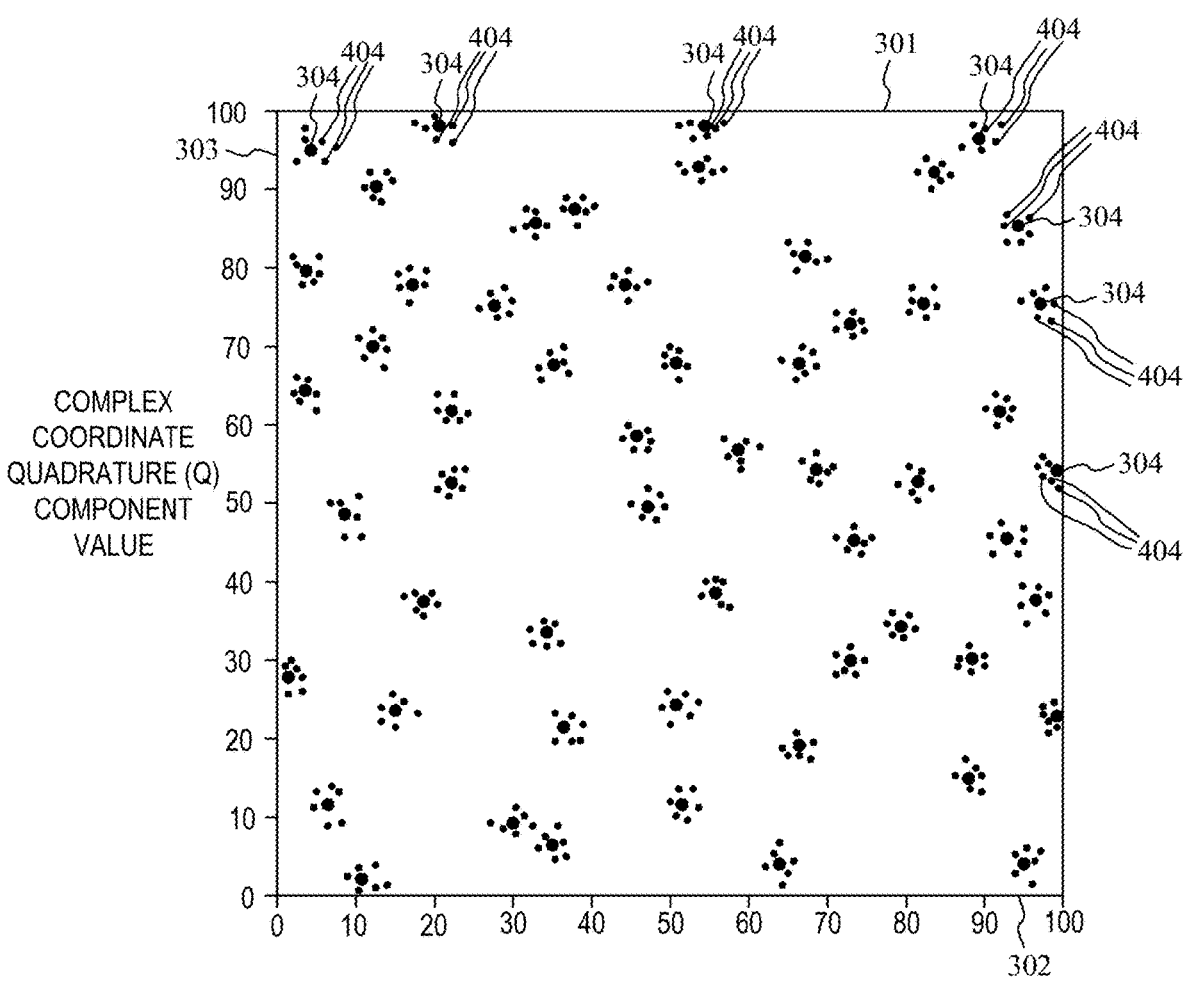
FIG. 4 is a graph illustrating an example of constellation points obtained by adding noise to the constellation points of FIG. 3, in accordance with at least one embodiment.

FIG. 4 is a graph illustrating an example of constellation points obtained by adding noise to the constellation points of FIG. 3, in accordance with at least one embodiment. Graph 400 shows complex plane 301 having an I axis 302 and a Q axis 303. Constellation points 304 are located at various I and Q coordinates in complex plane 301. Near each of constellation points 304 are instances 404 of those constellation points that have been shifted in I coordinate value, Q coordinate value, or both away from the locations of their respective constellation points 304. As an example, the shifted locations of instances 404 can reflect changes as would be expected from the influence of channel noise on constellation points 304. Accordingly, instances 404 can reflect a probability distribution of constellation points as affected by noise.

Figure 5:
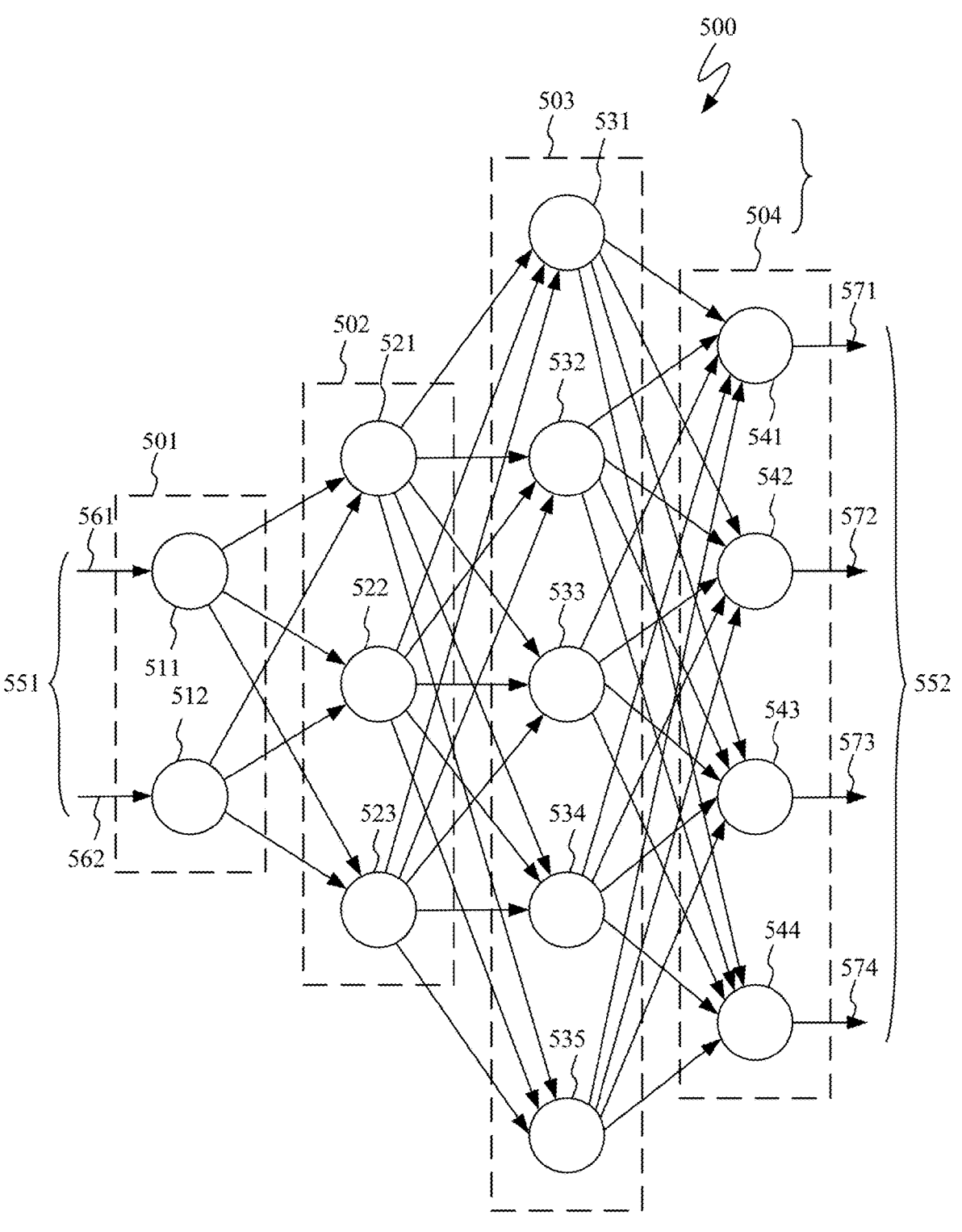
FIG. 5 is a block diagram illustrating an example of a neural network for generating constellation points (e.g., as shown in FIG. 3) in accordance with at least one embodiment.

FIG. 5 is a block diagram illustrating an example of a neural network for generating constellation points (e.g., as shown in FIG. 3) in accordance with at least one embodiment. Neural network 500 comprises a plurality of neural-network layers 501, 502, 503, and 504. Different layers of neural network 500 may contain different numbers of nodes. Between some layers, the number of dimensions in which information is represented may increase. Between some layers, the number of dimensions in which information is represented may decrease.

Layer 501 comprises nodes 511 and 512. Layer 502 comprises nodes 521, 522, and 523. Layer 503 comprises nodes 531, 532, 533, 534, and 535. Layer 504 comprises nodes 541, 542, 543, and 544. Neural network 500 comprises input array 551. Input array 551 comprises input 561 and input 562. Input 561 is coupled to node 511. Input 562 is coupled to node 512. Node 511 provides an output to one or more (e.g., each of) nodes 521, 522, and 523. Node 512 provides an output to one or more (e.g., each of) nodes 521, 522, and 523. Node 521 provides an output to one or more (e.g., each of) nodes 531, 532, 533, 534, and 535. Node 522 provides an output to one or more (e.g., each of) nodes 531, 532, 533, 534, and 535. Node 523 provides an output to one or more (e.g., each of) nodes 531, 532, 533, 534, and 535.

Node 531 provides an output to one or more (e.g., each of) nodes 541, 542, 543, and 544. Node 532 provides an output to one or more (e.g., each of) nodes 541, 542, 543, and 544. Node 533 provides an output to one or more (e.g., each of)

nodes 541, 542, 543, and 544. Node 534 provides an output to one or more (e.g., each of) nodes 541, 542, 543, and 544. Node 535 provides an output to one or more (e.g., each of) nodes 541, 542, 543, and 544. Node 541 provides an output 571. Node 542 provides an output 572. Node 543 provides an output 573. Node 544 provide an output 574. Output array 552 comprises outputs 571, 572, 573, and 574. The numbers of layers and their numbers of nodes, inputs, and outputs shown are exemplary, and other number of such features may be employed.

Figure 6:
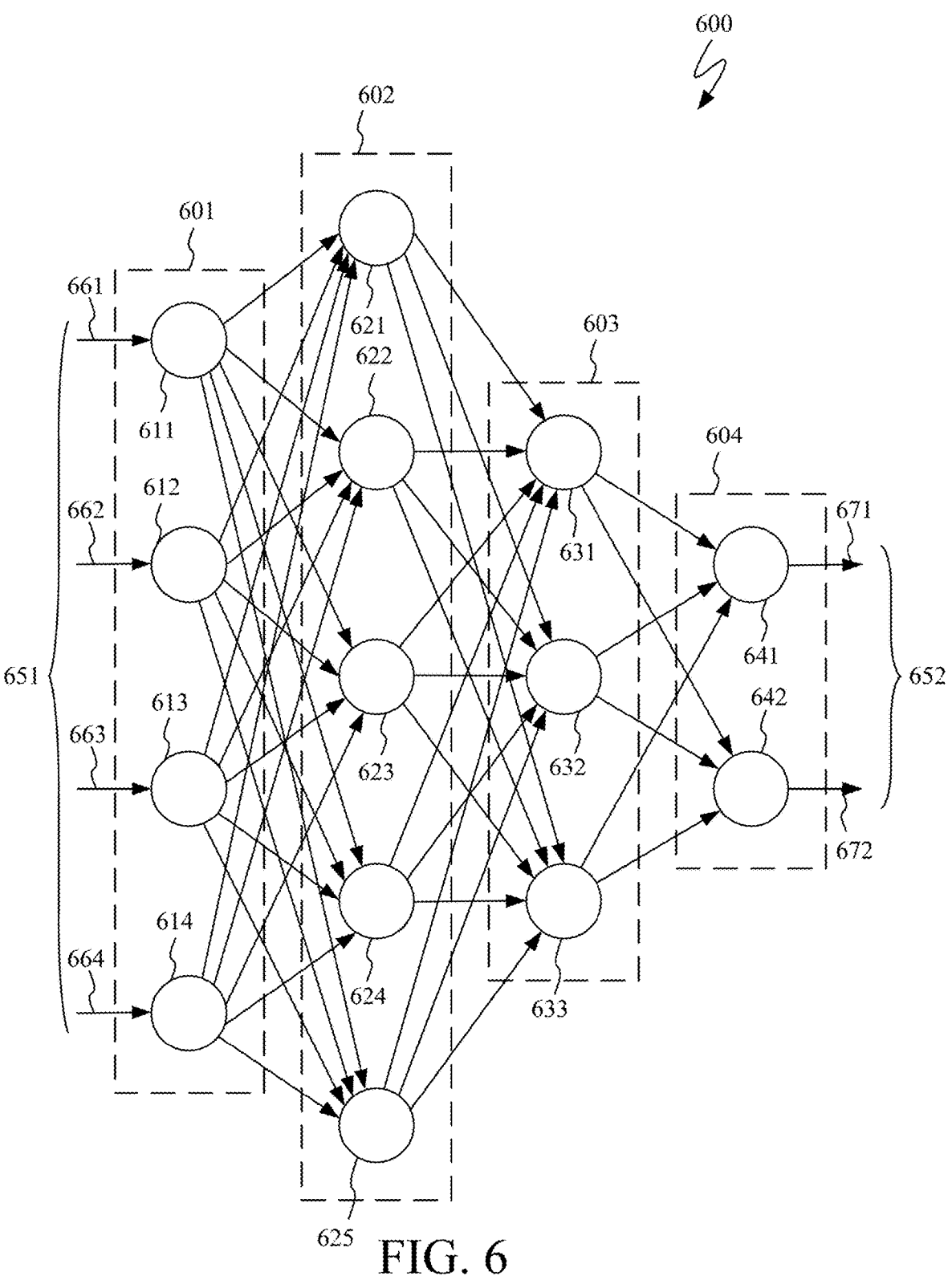
FIG. 6 is a block diagram illustrating an example of a neural network for mapping constellation points with added noise (e.g., as shown in FIG. 4) in accordance with at least one embodiment.

FIG. 6 is a block diagram illustrating an example of a neural network for mapping constellation points with added noise (e.g., as shown in FIG. 4) in accordance with at least one embodiment. Neural network 600 comprises a plurality of neural-network layers 601, 602, 603, and 604. Different layers of neural network 600 may contain different numbers of nodes. Between some layers, the number of dimensions in which information is represented may increase. Between some layers, the number of dimensions in which information is represented may decrease.

Layer 601 comprises nodes 611, 612, 613, and 614. Layer 602 comprises nodes 621, 622, 623, 624, and 625. Layer 603 comprises nodes 631, 632, and 633. Layer 604 comprises nodes 641 and 642. Neural network 600 comprises input array 651. Input array 651 comprises input 661, input 662, input 663, and input 664. Input 661 is coupled to node 611. Input 662 is coupled to node 612. Input 663 is coupled to node 613. Input 664 is coupled to node 614. Node 611 provides an output to one or more (e.g., each of) nodes 621, 622, 623, 624, and 625. Node 612 provides an output to one or more (e.g., each of) nodes 621, 622, 623, 624, and 625. Node 613 provides an output to one or more (e.g., each of) nodes 621, 622, 623, 624, and 625. Node 614 provides an output to one or more (e.g., each of) nodes 621, 622, 623, 624, and 625. Node 621 provides an output to one or more (e.g., each of) nodes 631, 632, and 633. Node 622 provides an output to one or more (e.g., each of) nodes 631, 632, and 633. Node 623 provides an output to one or more (e.g., each of) nodes 631, 632, and 633. Node 624 provides an output to one or more (e.g., each of) nodes 631, 632, and 633. Node 625 provides an output to one or more (e.g., each of) nodes 631, 632, and 633.

Node 631 provides an output to one or more (e.g., each of) nodes 641 and 642. Node 632 provides an output to one or more (e.g., each of) nodes 641 and 642. Node 641 provides an output 671. Node 642 provides an output 672. Output array 652 comprises outputs 671 and 672. The numbers of layers and their numbers of nodes, inputs, and outputs shown are exemplary, and other number of such features may be employed.

Figure 7:
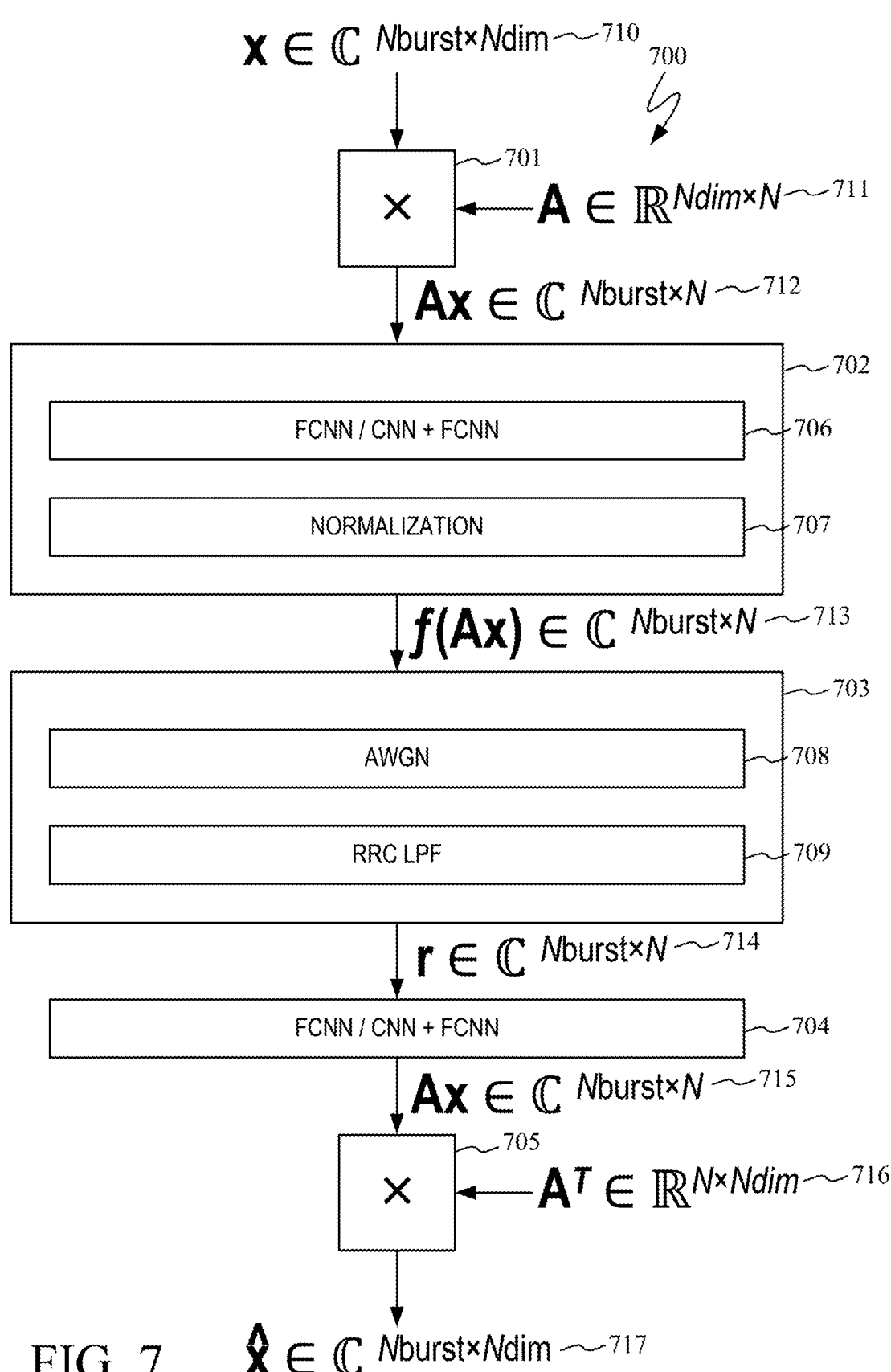
FIG. 7 is a flow diagram illustrating a method in accordance with at least one embodiment.

FIG. 7 is a flow diagram illustrating a method in accordance with at least one embodiment. A transmit data value x is obtained, where x is an element of a multi-dimensional array of complex values. As an example, dimensions of the array of complex values may be $N_{burst}$ by $N_{dim}$, where $N_{burst}$ represents a number of units of data in a burst of data and $N_{dim}$ represents a number of a dimension of the modulation to be performed based on the data. As an example, for QAM with a square constellation, the number of the dimension of the modulation to be performed may be the square root of the number of constellation points in the constellation. The array of complex values may be expressed as $\mathbb{C}^{N_{burst} \times N_{dim}}$. An orthonormal transformation matrix A is obtained, where A is an element of a multi-dimensional array of real values. As an example, dimensions of the array of real values may be $N_{dim}$ by N, where N represents a number of possible orthonormal vectors. As an example, the array of real values may be expressed as $\mathbb{R}^{N_{dim} \times N}$. In flow diagram 700, at block 701, transmit data value x and orthonormal transformation matrix A are obtained. Transmit data value x may be an element of a stream of data to be transmitted by a transmitter, for example. At block 701, a product Ax of transmit data value x and orthonormal transformation matrix A is provided, where the product Ax is an element of the array of complex values $\mathbb{C}^{N_{burst} \times N}$.

At block 702, product Ax is received and processed according to a neural network. Block 702 comprises subblock 706 and subblock 707. In block 702, at subblock 706, product Ax is processed according to layers of a neural network. As an example, the neural network may be a Fourier convolutional neural network (FCNN). As another example, the neural network may comprise a FCNN and a convolutional neural network (CNN). As an example, the neural network may comprise a series of feed-forward neural networks (FNNs). For example, the series of FNNs can be configured to provide an autoencoder architecture. In block 702, at subblock 707, a normalization layer is provided. The normalization layer, may, for example, comprise one or more activation layers, one or more bias layers, or the like. In block 702, a function $f$ is performed, yielding a result $f(Ax)$, where $f(Ax)$ is an element of the array of complex values $\mathbb{C}^{N_{burst} \times N}$. In accordance with at least one embodiment, the output of block 702 is a transmit signal 713, which is provided to a communication channel, as may be represented by block 703.

At block 703, the output of block 702, result $f(Ax)$, is received, noise is added, and filtering is performed. At block 703, in subblock 708, noise is added to the transmit signal represented by $f(Ax)$. As an example, additive Gaussian white noise is added. For example, subblock 708 can be represented as performing a function $p(r|f(Ax))$, denoting a conditional probability of r given $f(Ax)$. A noise-added transmit signal from subblock 708 is provided to subblock 709. At block 703, in subblock 709, low-pass filtering is performed. As an example, root-raised-cosine (RRC) low-pass filtering may be performed, with a noise-added transmit signal from subblock 708 passed through a RRC low-pass filter (LPF), resulting in filtered noise-added transmit signal, in the form of a receive signal 714, denoted by r. Receive signal 714 is an element of the array of complex values $\mathbb{C}^{N_{burst} \times N}$.

At block 704, receive signal 714 is received and processed by a neural network. As an example, the neural network may be a Fourier convolutional neural network (FCNN). As another example, the neural network may comprise a FCNN and a convolutional neural network (CNN). The neural network provides classification of the received signal. In accordance with at least one embodiment, block 704 may apply an activation function to the values from the neural network. As an example, the activation function can be a softmax activation function. In accordance with at least one embodiment, block 704 may map the output of the neural network, for example, the output of the activation function, which may be incorporated into the neural network, to yield a probability distribution of products of received data values, denoted by x, and orthonormal transformation matrix A, according to the received signal. As an example, such a product 715 can be selected according to a most likely possible product having a highest probability according the probability distribution. Block 704 provides product 715, denoted as Ax, which is an element of the array of complex values $\mathbb{C}^{N_{burst} \times N}$. At block 705, inverse orthonormal transformation matrix 716, denoted as $A^T$, is obtained, and product 715 is multiplied by inverse orthonormal transformation matrix 716 to yield $A \times A^T$. Inverse orthonormal transformation matrix $A^T$ is an element of the array of real values $\mathbb{R}^{N \times N_{dim}}$. The product of Ax times $A^T$ yields the received data 717, represented as $\hat{x}$, where $\hat{x}$ is an element of $\mathbb{C}^{N_{burst} \times N_{dim}}$.

In accordance with at least one embodiment, a method such as that illustrated in FIG. 7 can be implemented in autoencoder for a communication channel, such as an AWGN channel. In accordance with at least one embodiment, an autoencoder may prescribe locations for constellation points in a constellation for modulation of transmit data values on a transmit signal. In accordance with at least one embodiment, an autoencoder may prescribe regions within a constellation for determining receive data values from a receive signal. In accordance with at least one embodiment, such an autoencoder may be used to implement a neural-network-based encoder, a neural-network-based decoder, or both.

In accordance with at least one embodiment, a transmitter may comprise blocks 701 and 702. In accordance with at least one embodiment, a transmitter may comprise block 701, block 702, and a LPF, such as RRC LPF 709 of block 703, which can, for example, spectrally limit the output of block 702. In accordance with at least one embodiment, a communication channel may comprise subblock 708 of block 703, which can be present explicitly or implicitly. For example, a communication channel may be implicitly noisy due to natural or artificial phenomena. In accordance with at least one embodiment, a communication channel may comprise subblock 708 and subblock 709 of block 703. For example, a communication channel may be both noisy and constrained in its usable spectral range, either explicitly or implicitly. A communication channel may be an actual communication channel or a simulated communication channel. In accordance with at least one embodiment, a receiver may comprise blocks 704 and 705. In accordance with at least one embodiment, a receiver may comprise subblock 709 of block 703, block 704, and block 705. In accordance with at least one embodiment, a receiver may comprise a filter other than the LPF of subblock 709, block 704, and block 705. For example, a filter may exclude adjacent channel interference or noise elsewhere in the spectrum outside of the spectral range of the signal to be provided to block 704.

Figure 8:
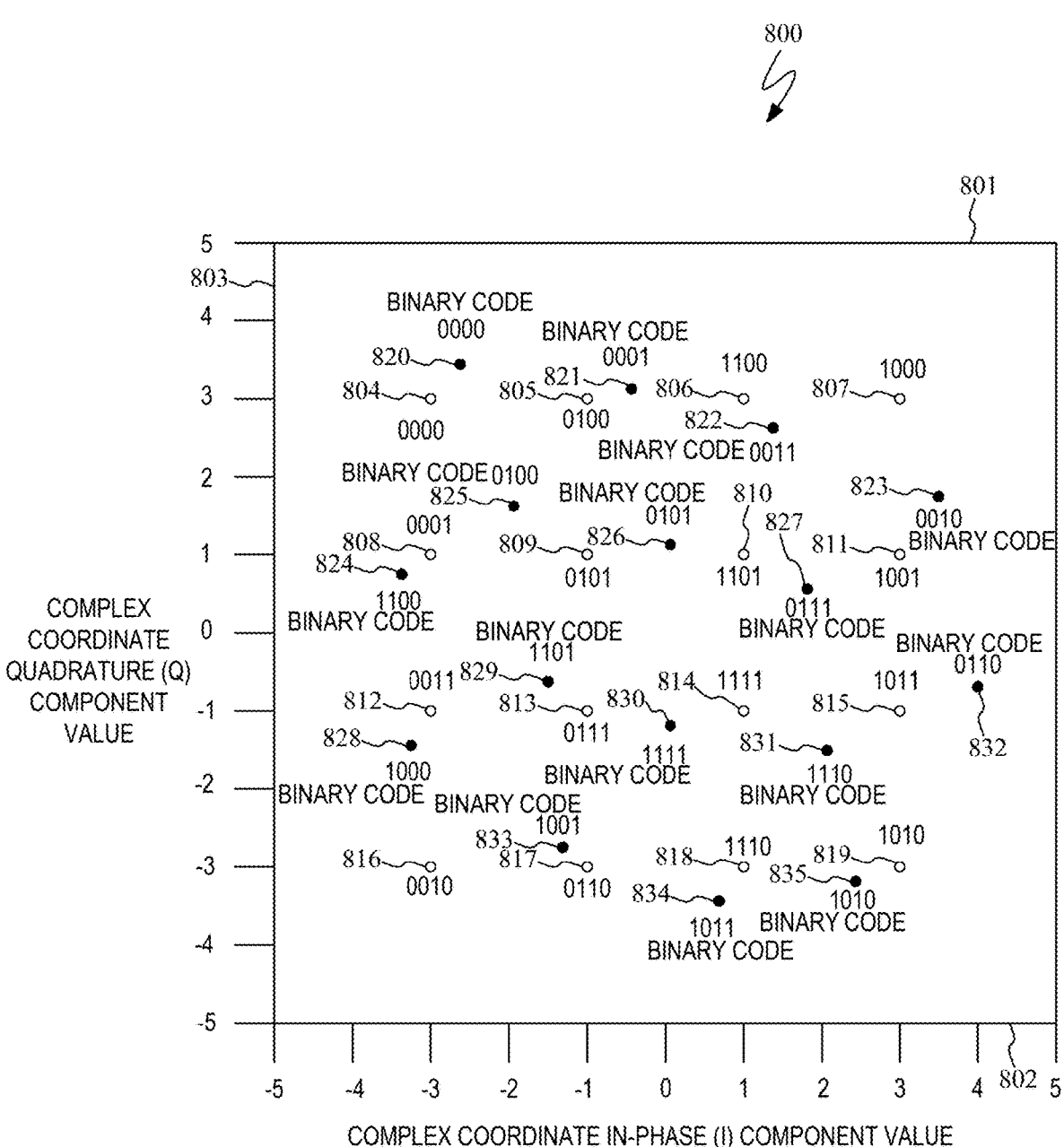
FIG. 8 is a graph illustrating an example of constellation points in accordance with at least one embodiment shown with respect to rectilinearly regular constellation points.

FIG. 8 is a graph illustrating an example of constellation points in accordance with at least one embodiment shown with respect to rectilinearly regular constellation points. Graph 800 shows complex plane 801 having an I axis 802 and a Q axis 803. For reference, a regularly spaced rectilinear set of constellation points is shown as constellation point 804, constellation point 805, constellation point 806, constellation point 807, constellation point 808, constellation point 809, constellation point 810, constellation point 811, constellation point 812, constellation point 813, constellation point 814, constellation point 815, constellation point 816, constellation point 817, constellation point 818, and constellation point 819. Constellation point 804 represents a data value in binary of 0000. Constellation point 808 represents a data value in binary of 0001. Constellation point 816 represents a data value in binary of 0010. Constellation point 812 has a value in binary of 0011. Constellation point 805 represents a data value in binary of 0100. Constellation point 809 represents a data value in binary of 0101. Constellation point 817 represents a data value in binary of 0110. Constellation point 813 represents a data value in binary of 0111. Constellation point 807 represents a data value in binary of 1000. Constellation point 811 represents a data value in binary of 1001. Constellation point 819 represents a data value in binary of 1010. Constellation point 815 represents a data value in binary of 1011. Constellation point 806 represents a data value in binary of 1100. Constellation point 810 represents a data value in binary of 1101. Constellation point 818 represents a data value in binary of 1110. Constellation point 814 represents a data value in binary of 1111.

Also shown on graph 800 are a set of constellation points in accordance with at least one embodiment comprising constellation point 820, constellation point 821, constellation point 822, constellation point 823, constellation point 824, constellation point 825, constellation point 826, constellation point 827, constellation point 828, constellation point 829, constellation point 830, constellation point 831, constellation point 832, constellation point 833, constellation point 834, and constellation point 835. As shown, such constellation points are not in a regularly spaced rectilinear pattern. Rather, their exemplary spacings and pattern can be determined according to the methods and apparatuses disclosed herein.

Constellation point 820 represents a data value in binary of 0000. Constellation point 821 represents a data value in binary of 0001. Constellation point 823 represents a data value in binary of 0010. Constellation point 822 represents a data value in binary of 0011. Constellation point 825 represents a data value in binary of 0100. Constellation point 826 represents a data value in binary of 0101. Constellation point 832 represents a data value in binary of 0110. Constellation point 827 represents a data value in binary of 0111. Constellation point 828 represents a data value in binary of 1000. Constellation point 833 represents a data value in binary of 1001. Constellation point 835 represents a data value in binary of 1010. Constellation point 834 represents a data value in binary of 1011. Constellation point 824 represents a data value in binary of 1100. Constellation point 829 represents a data value in binary of 1101. Constellation point 831 represents a data value in binary of 1110. Constellation point 830 represents a data value in binary of 1111.

Figure 9:
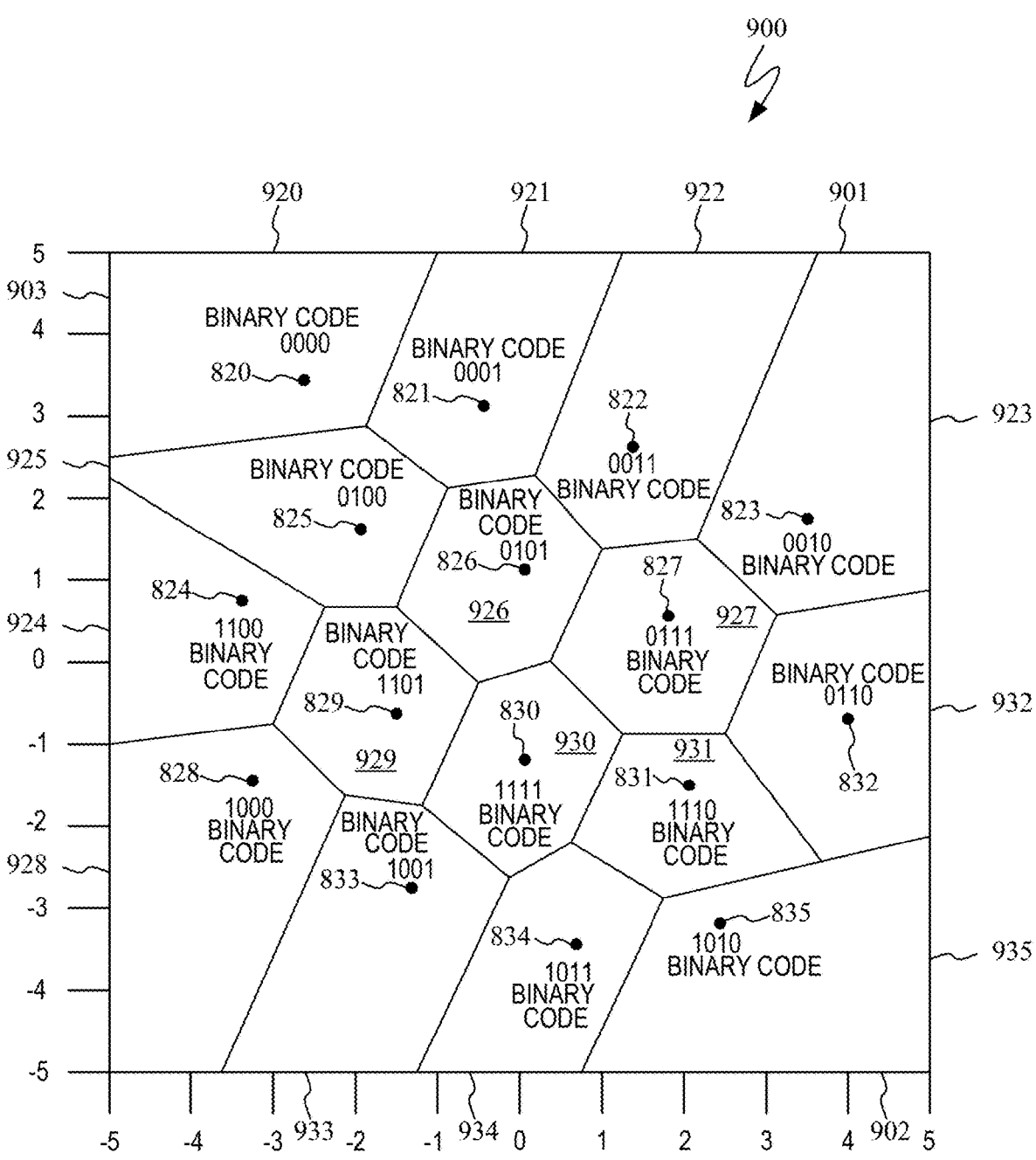
FIG. 9 is a graph illustrating an example of regions of a plane corresponding to constellation points in the plane in accordance with at least one embodiment.

FIG. 9 is a graph illustrating an example of regions of a plane corresponding to constellation points in the plane in accordance with at least one embodiment. Graph 1000 shows complex plane 901 having an I axis 902 and a Q axis 903. Graph 900 includes constellation points 820, 821, 822, 823, 824, 825, 826, 827, 828, 829, 830, 831, 832, 833, 834, and 835 from FIG. 8. Graph 900 shows regions which map to the values of constellation points lying in the regions. Each region covers an area of coordinates based on values along I axis 902 and on values along Q axis 903. Region 920 includes coordinates, including constellation point 820, interpreted to represent a data value in binary of 0000. Region 921 includes coordinates, including constellation point 821, interpreted to represent a data value in binary of 0001. Region 922 includes coordinates, including constellation point 822, interpreted to represent a data value in binary of 0011. Region 923 includes coordinates, including constellation point 823, interpreted to represent a data value in binary of 0010. Region 924 includes coordinates, including constellation point 824, interpreted to represent a data value in binary of 1100. Region 925 includes coordinates, including constellation point 825, interpreted to represent a data value in binary of 0100. Region 926 includes coordinates, including constellation point 826, interpreted to represent a data value in binary of 0101. Region 927 includes coordinates, including constellation point 827, interpreted to represent a data value in binary of 0111. Region 928 includes coordinates, including constellation point 828, interpreted to represent a data value in binary of 1000. Region 929 includes coordinates, including constellation point 829, interpreted to represent a data value in binary of 1101. Region 930 includes coordinates, including constellation point 830, interpreted to represent a data value in binary of 1111. Region 931 includes coordinates, including constellation point 831, interpreted to represent a data value in binary of 1110. Region 932 includes coordinates, including constellation point 832, interpreted to represent a data value in binary of 0110. Region 933 includes coordinates, including constellation point 833, interpreted to represent a data value in binary of 1001. Region 934 includes coordinates, including constellation point 834, interpreted to represent a data value in binary of 1011. Region 935 includes coordinates, including constellation point 835, interpreted to represent a data value in binary of 1010.

The boundaries of the regions shown in graph 900 can be established according to the methods and apparatus disclosed herein. For example, an autoencoder trained using addition of noise to a simulated communication channel can establish the boundaries of the regions shown in graph 900 to improve the reliability of communications. As an example, for a point near such a boundary, the boundary can be established to locate the point within a region corresponding to the data value it most likely represents. The boundary can be established based upon training of the autoencoder with a plurality of various noise-influenced points.

As another example, the boundaries of the regions can be adapted based on communication over an actual communication channel influenced by actual noise introduced by the actual communication channel. For example, error detection techniques can be used to find errors in the received data, and the detection of such errors can be used to refine the locations of the boundaries of the regions. Refined locations of boundaries of regions can reduce error rates for data communicated over the communication channel.

Figure 10:
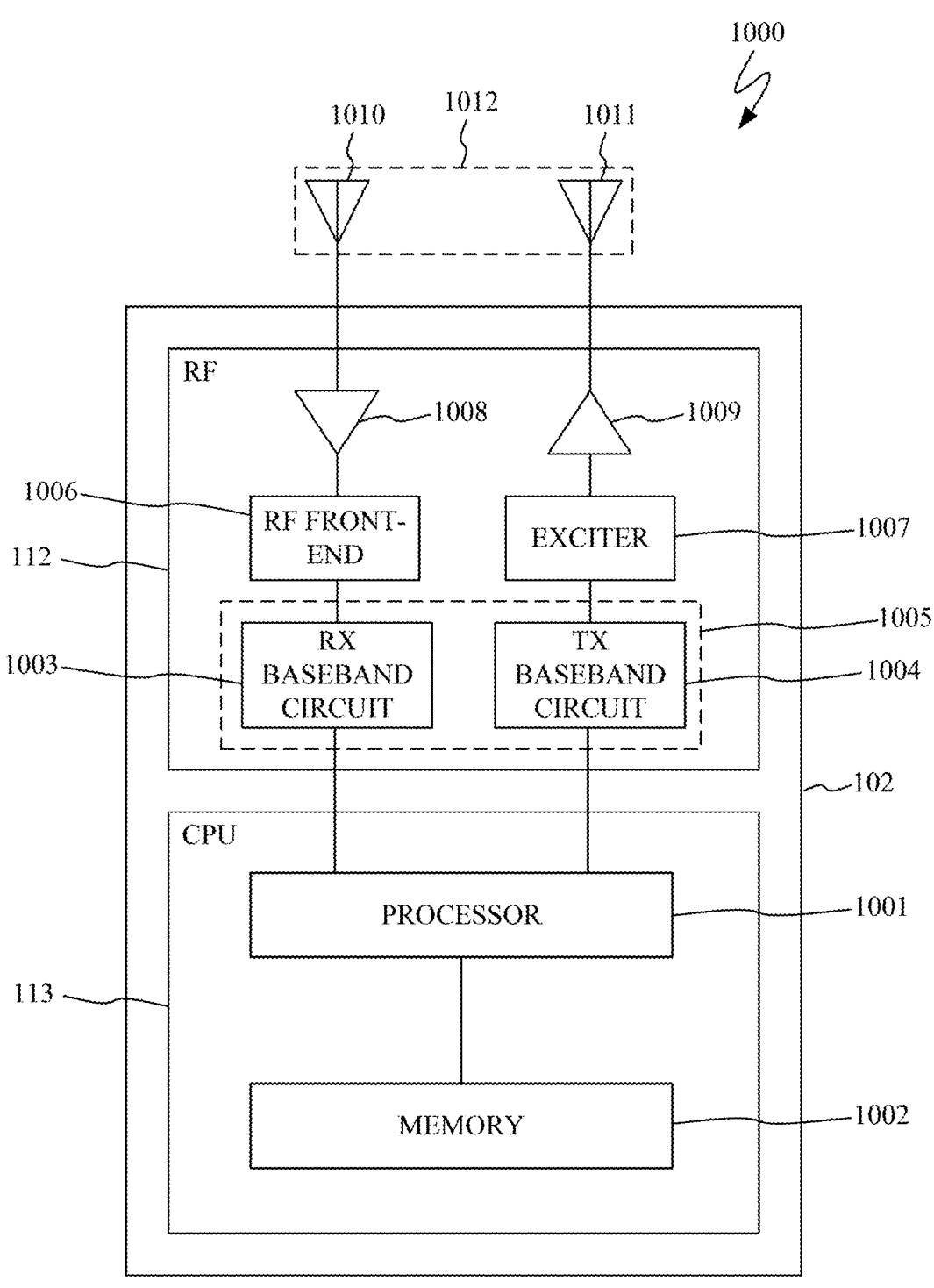
FIG. 10 is a block diagram illustrating an example of an apparatus according to which at least one embodiment may be implemented.

FIG. 10 is a block diagram illustrating an example of an apparatus according to which at least one embodiment may be implemented. As in FIG. 1, apparatus 102 comprises radio subsystem 112, bearing the exemplary label RF for radio frequency, and processor subsystem 113, bearing the exemplary label CPU for central processing unit. Processor subsystem 113 comprises processor 1001 and memory 1002. Processor 1001 is coupled to memory 1002. Processor 1001 can retrieve instructions stored in memory 1002 and execute the instructions to perform operations as described herein. Processor 1001 may comprise a plurality of processors, which may be of the same type or may include different types. As examples, processor 1001 may comprise one or more of a central processing unit (CPU), a graphics processing unit (GPU), a neural processing unit (NPU), or any other processor of a generalized or specialized nature. Processor 1001 or a combination of processor 1001 and memory 1002 can operate together to implement a processing circuit. As an example, memory 1002 can store parameter values to bias processing in a neural network implemented using processor 1001. As another example, processor 1001 can store such parameter values internally. For example, parameter values stored in memory 1002 can be loaded into processor 1001. As another example, processor 1001 can provide parameter values to memory 1002, and memory 1002 can store those parameter values.

Radio subsystem 112 may comprise a plurality of RF components. In accordance with at least one embodiment, radio subsystem 112 comprises baseband circuitry 1005. In accordance with at least one embodiment, baseband circuit 1005 comprises receive (RX) baseband circuit 1003 and transmit (TX) baseband circuit 1004. In accordance with at least one embodiment, radio subsystem 112 comprises RF front-end circuit 1006. In accordance with at least one embodiment, radio subsystem 112 comprises exciter circuit 1007. In accordance with at least one embodiment, radio subsystem 112 comprises preamplifier 1008. In accordance with at least one embodiment, radio subsystem 112 comprises power amplifier 1009.

In accordance with at least one embodiment, RF subsystem 112 is coupled to antenna subsystem 1012. Antenna subsystem 1012 comprises at least one antenna. As an example, antenna subsystem 1012 comprises RX antenna 1010 and TX antenna 1011.

In accordance with at least one embodiment, processor subsystem 113 is coupled to radio subsystem 112. As an example, processor 1001 may be coupled to baseband circuit 1005. For example, processor 1001 may be coupled to RX baseband circuit 1003. As another example, processor 1001 may be coupled to TX baseband circuit 1004.

In accordance with at least one embodiment, TX baseband circuit 1004 is coupled to exciter circuit 1007. Exciter circuit 1007 receives a transmit signal, e.g., a baseband transmit signal, from TX baseband circuit 1004 and provides a RF transmit signal at a desired radio frequency. As an example, exciter circuit 1007 may be implemented as an upconverter. As another example, exciter circuit 1007 may be implemented as a digital-to-analog converter (DAC). As another example, exciter circuit 1007 may be implemented as an oscillator, wherein at least one parameter of the oscillator output signal, such as amplitude, frequency, or phase, may be controlled to modulate the oscillator output signal. Exciter circuit 1007 is coupled to power amplifier (PA) 1009. PA 1009 receives the RF transmit signal from exciter circuit 1007. PA 1009 amplifies the RF transmit signal. Radio subsystem 112 is coupled to antenna subsystem 1012. As an example, PA 1009 is coupled to antenna subsystem 1012. PA 1009 provides an amplified RF transmit signal to antenna subsystem 1012. As an example, PA 1009 is coupled to TX antenna 1011. TX antenna 1011 radiates the amplified RF transmit signal.

In accordance with at least one embodiment, antenna subsystem 1012 is coupled to preamplifier 1008. As an example, RX antenna 1010 is coupled to preamplifier 1008. Preamplifier 1008 conditions an antenna receive signal from antenna subsystem 1012. As an example, preamplifier 1008 may amplify the antenna receive signal. As another example, preamplifier 1008 may filter the antenna receive signal. Preamplifier 1008 is coupled to RF front-end circuit 1006. RF front-end circuit 1006 converts a conditioned receive signal from preamplifier 1008 to a baseband receive signal. As an example, RF front-end circuit 1006 may be implemented as a downconverter. As another example, RF front-end circuit 1006 may be implemented as an analog-to-digital converter (ADC). RF front-end circuit 1006 is coupled to baseband circuit 1005. As an example, RF front-end circuit 1006 may be coupled to RX baseband circuit 1003. RF front-end circuit 1006 provides the baseband receive signal to RX baseband circuit 1003. Baseband circuit 1005 provides a receive signal to processor subsystem 113. As an example, baseband circuit 1005 provides the receive signal to processor 1001. As an example, RX baseband circuit 1003 provides the receive signal to processor 1001.

Quadrature amplitude modulation (QAM) has provided increased data rates over simpler modulation techniques but with decreased noise immunity. Moreover, QAM has left significant shortcomings between actual performance and the ideal of Shannon-limit channel capacity. One prominent disadvantage of traditional QAM, especially in higher-order constellations, is its susceptibility to both external and internal interference, resulting in error-prone communication channels. This can lead to decreased data reliability and increased error correction overhead. Additionally, QAM schemes often require a considerable signal-to-noise ratio (SNR) to maintain acceptable performance, making them less suitable for scenarios with challenging propagation conditions or limited power resources. Moreover, the spectral efficiency of conventional QAM can plateau at higher orders due to increased inter-symbol interference (ISI), limiting its ability to maximize data rates within a given bandwidth.

A novel modulation technology is provided. At least one embodiment is applicable to wireless communication. At least one embodiment is applicable to cellular communication. At least one embodiment is applicable to satellite communication. At least one embodiment is applicable to non-cellular terrestrial wireless communication. At least one embodiment is applicable to communication conducted over a wire-based medium.

At least one embodiment can mitigate the spectral inefficiencies observed in high-order QAM schemes, which often lead to bandwidth congestion and reduced data rates. At least one embodiment can enhance signal robustness against various forms of interference and channel impairments, thereby ensuring more reliable and consistent data transmission, especially in scenarios with unfavorable propagation conditions. With applicability to a wide range of communication systems, including both terrestrial and satellite-based, a unified modulation approach can be provided, which can simplify design and operation of diverse communication platforms. At least one embodiment can improve spectral utilization, signal resilience, and system versatility, providing efficient and reliable digital communication.

At least one embodiment provides adaptability and predictive capabilities, increasing energy efficiency of communication. A neural-network-based approach not only optimizes spectral efficiency and signal robustness but also reduces energy required to communicate signals.

At least one embodiment overcomes existing limitations by leveraging artificial intelligence (AI) to dynamically adapt modulation parameters and optimize signal constellations. At least one embodiment empowers the system to handle interference more robustly, operate at lower SNRs, and significantly enhance spectral efficiency while achieving energy savings. As the order of traditional QAM constellations increases to accommodate higher data rates, the symbols become more densely packed in the signal space, leading to a phenomenon known as constellation crowding. Constellation crowding results in increased susceptibility to intersymbol interference (ISI), where neighboring symbols begin to interfere with each other due to the limited separation between them. As an example, ISI can occur where constellation points are close enough to each other as to result in ambiguity in determining receive data values, for example, in the presence of noise, distortion, or interference. As another example, a symbol can be spread beyond a temporal boundary to affect reception of a subsequent symbol. Consequently, constellation crowding can constrain achievable data rates and spectral efficiency, as the intersymbol interference imposes a limit on how closely symbols can be positioned within the modulation constellation. While a sparser QAM constellation could be selected to reduce ISI and increase noise immunity, such selection would reduce the data rate of the channel. For example, selecting 16-constellation-point QAM (16-QAM) instead of 64-constellation-point QAM (64-QAM) could reduce the data rate by about a third (e.g., from six bits per symbol for 64-QAM to four bits per symbol for 16-QAM). At least one embodiment employs an intelligent modulation scheme that can dynamically adjust constellation points based on real-time channel conditions. At least one embodiment can provide dynamic adaptation without a need to change the numbers of constellation points in a constellation, avoiding drastic data rate penalties. According to at least one embodiment, the dynamic adaptation mitigates constellation crowding, allowing for higher-order modulations with reduced ISI and improving spectral efficiency, thus enabling greater data rates while still maintaining data integrity. At least one embodiment can operate over a channel having a lower SNR without increasing the error rate as compared to traditional QAM. At least one embodiment provides improved spectral efficiency through a multi-dimensional mapping function.

In accordance with at least one embodiment, an adaptive constellation geometry is provided. As an example, the adaptive constellation geometry is not constrained to a regularly spaced rectilinear grid. At least one embodiment may be configured to use irregularly spaced constellation points. At least one embodiment may be configured to use constellation points which each have a unique real component value. At least one embodiment may be configured to use constellation points which each have a unique imaginary component value. At least one embodiment may be configured to use constellation points having a number of real component values greater than a square root of the number of constellation points in the constellation. At least one embodiment may be configured to use constellation points having a number of imaginary component values greater than a square root of the number of constellation points in the constellation.

In accordance with at least one embodiment, a multi-dimensional mapping function is implemented. As an example, a multi-dimensional mapping function can increase the number of dimensions from two dimensions (e.g., a complex value having a real component and an imaginary component) to a larger number of dimensions. A higher number of dimensions can allow processing of additional information. As an example, information introduced according to a plurality of trials of a modulation model may be processed.

In accordance with at least one embodiment, a multi-dimensional de-mapping function is implemented. As an example, a multi-dimensional de-mapping function can decrease the number of dimensions from a larger number of dimensions to two dimensions (e.g., a complex value having a real component and an imaginary component). Reducing the number of dimensions can compel deep learning, preventing the learning of a mere identity function. Reducing the number of dimensions to two dimensions provides compatibility with complex values which provide compatibility with quadrature-based communication systems.

In accordance with at least one embodiment, an AI-based demodulator is implemented. An AI-based demodulator can apply deep learning to adaptively adjust demodulator parameter values to improve performance. Such deep learning can be performed based on noise (e.g., AWGN) added to a transmit signal to improve performance of a communication system for practical application where a communication channel is affected by noise.

At least one embodiment improves the error rate performance and improves spectral efficiency over traditional QAM. In accordance with at least one embodiment, an error rate metric can be calculated and applied to a deep learning process. In accordance with at least one embodiment, a spectral efficiency metric can be calculated and applied to a deep learning process. A neural-network-based encoder can implement a modulator with improved error rate performance, with improved spectral efficiency, or with both. A neural-network-based decoder can implement a demodulator with improved error rate performance, with improved spectral efficiency, or with both.

In accordance with at least one embodiment, a transmitter comprising a neural-network encoder is implemented in a circuit comprising a plurality of semiconductor devices. As an example, a transmitter can be implemented in a field-programmable gate array (FPGA) integrated circuit.

In accordance with at least one embodiment, a receiver comprising a neural-network decoder is implemented in a circuit comprising a plurality of semiconductor devices. As an example, a receiver can be implemented in a field-programmable gate array (FPGA) integrated circuit.

In accordance with at least one embodiment, a neural-network-based encoder is implemented as an autoencoder (AE). At least one embodiment can perform unsupervised learning of modulation parameter values and their effects on communications in the presence of noise.

In accordance with at least one embodiment, a communication system or a component thereof (e.g., a transmitter or a receiver) with improved spectral efficiency (SE) can be provided. In accordance with at least one embodiment, a communication system or a component thereof (e.g., a transmitter or a receiver) tolerant of a lower signal-to-noise ratio (SNR) can be provided. In accordance with at least one embodiment, a communication system or a component thereof (e.g., a transmitter or a receiver) compatible with applications of traditional quadrature amplitude modulation (QAM) but with improved performance can be provided.

In accordance with at least one embodiment, a method and apparatus for modulation or demodulation is provided. As an example, modulation or demodulation may be performed according to a real-time neural-network implementation or an implementation that utilizes one or more constellations previously obtained using a neural network. As an example, parameter values descriptive of a constellation, such as that shown in FIG. 8, can be conveyed to a modulation subsystem. The parameter values descriptive of the constellation may then be used by the modulation system to modulate a transmit signal based on constellation points corresponding to data values of data to be transmitted.

As an example, parameter values descriptive of criteria for classification of a receive signal, for example, the boundaries between areas within which receive signal modulation is deemed to represent respective data values, as shown, for example, in FIG. 9, can be conveyed to a demodulation subsystem. As parameter values descriptive of a constellation may be concise relative to a large amount of data that may be transported according to a described constellation, sets of parameter values may be frequently updated without substantially diminishing payload data rates of the data payload being communicated according to a described constellation. As an example, a receiver can analyze receive performance and change the parameter values descriptive of its criteria for classification of a receive signal. For example, the receiver can select among a plurality of sets of such parameter values. As one example, a receiver can perform such selection without communication of its selection to the transmitter sending the transmit signal. As another example, a receiver can communicate information about its selection to the transmitter, allowing the transmitter to select a set of parameter values according to which it modulates the transmit signal.

In accordance to one embodiment, a closed-loop system can be provided where the receiver can monitor reliability of communication, for example, by monitoring an error rate, adjusting either or both of parameter values descriptive of criteria for classification of a receive signal and parameter values descriptive of a constellation according to which a transmit signal is modulated. The adjustments can be based on either real-time neural network processing or on results of previous neural network processing. As an example, real-time neural network processing at a receiver can update parameter values descriptive of its criteria for classification of a receive signal and can communicate such parameter values to a transmitter. The transmitter can perform neural network processing to update parameter values descriptive of a constellation according to which the transmit signal is modulated. The transmitter can communicate to the receiver the parameter values descriptive of the constellation according to which the transmit signal is modulated. The receiver can perform neural network processing to update parameter values descriptive of its criteria for classification of a receive signal to adapt to the parameter values updated by the transmitter. As another example, either or both of the transmitter and receiver may store sets of results of previous neural network processing and select among such sets of results to update parameter values descriptive of a constellation according to which the transmit signal is modulated, parameter values descriptive of criteria for classification of a receive signal, or both.

In accordance with at least one embodiment, an artificial intelligence (AI) modulator is provided. In accordance with at least one embodiment, an AI demodulator is provided. As an example, deep learning may be used to map symbols to modulation values, for example, pairs of I component and Q component values. As an example, deep learning may be used to perform classification of symbols based on modulation values, for example, pairs of I component and Q component values.

In accordance with at least one embodiment, deep learning can select parameter values for communication in the presence of noise to reduce an energy per bit to noise power spectral density ratio ($E_b/N_0$) or to reduce a bit error rate (BER). As an example, parameter values can be selected to reduce the $E_b/N_0$ for a given BER. As another example, parameter values can be selected to reduce the BER for a given $E_b/N_0$.

In accordance with at least one embodiment, a method can comprise retrieving digital data. As an example, data to be transmitted can be provided for transmission. In accordance with at least one embodiment, QAM modulation to generate QAM constellation. The digital data are parsed into segments to determine a sequence of symbols according to which the QAM modulation is performed.

In accordance with at least one embodiment, the QAM constellation generated according to QAM modulation is passed through a neural-network-based encoder to convert the QAM constellation to a neural-network-based constellation. In accordance with at least one embodiment, an output of the neural-network-based constellation is passed through an orthonormal-vector-set (OVS) multidimensional mapper to provide a transmit signal.

In accordance with at least one embodiment, an output of the OVS multidimensional mapper is passed through a noise block. As an example, the noise block can be an AWGN block. As an example, noise block can add noise to the transmit signal to provide a receive signal. The receive signal can comprise the transmit signal plus the noise, such as AWGN. Attributes of the noise can be controlled and can be changed over time. As an example, attributes of the noise in the frequency domain or in the time domain can be controlled and can be changed over time. As an example, attributes of the noise can be tailored to conform to attributes of noise as may occur in a communication channel. As another example, an actual communication channel can be used to add noise to the transmit signal. For example, an actual communication channel can be used to implement an adaptive modulation system. For example, a neural-network-based decoder can be trained to classify symbols with respect to a constellation based on a receive signal influenced by noise added to the transmit signal either by a noise block or by a communication channel.

In accordance with at least one embodiment, an OVS de-mapper receives a receive signal and performs the inverse of the OVS mapping performed to obtain the transmit signal, resulting in the OVS de-mapper providing a de-mapped signal a neural-network-based decoder. In accordance with at least one embodiment, the neural-network-based decoder converts symbols with respect to a neural-network-based constellation to symbols with respect to a QAM constellation. In accordance with one embodiment, a QAM demodulator is used to demodulator the symbols with respect to the QAM constellation, resulting in reception of the digital data transmitted by the transmitter.

In accordance with at least one embodiment, neural-network-based constellation coding is obtained based on training of a neural network to minimize degradation occurring when going from symbols to bits. In accordance with at least one embodiment, Euclidean distances (EDs) of receive-signal constellation locations relative to the corresponding constellation points of the constellation by which the transmit signal is produced are determined during the reception process. From the EDs, a constellation point that is a neighbor of other receive-signal constellation locations for a similar symbol is determined. In accordance with at least one embodiment, a first bitstream (e.g., 0000) comprising data values to be represented by a symbol is assigned. In accordance with at least one embodiment, repetitions are performed. If the number of repetitions exceeds a threshold (e.g., 4), then the repetitions are ended. A first set of constellation points that had the constellation point identified from the EDs above as their neighbor are identified.

In accordance with at least one embodiment, a second bitstream (e.g., 0001, 0010) having a minimum bit shift (e.g., an adjacent gray-coded value) relative to the first bitstream is assigned. In accordance with at least one embodiment, based on the second bitstream, a second set of constellation points that had any constellation points among the first set of constellation points are identified. In accordance with at least one embodiment, the process continues to a maximum number of repetitions in relation to the first set of constellation points identified above. In accordance with at least one embodiment, the process returns to performing a threshold-limited number of repetitions as described above.

A training process is performed to train the neural networks implementing a modulation system as disclosed herein. In accordance with at least one embodiment, a series of bits of data is parsed into segments consistent with dimensions of a constellation of a QAM modulator. For example, a constellation point in a QAM implementation of M constellation points can represent n=log₂ M bits (e.g., six bits for 64-QAM), so the series of bits of data can be parsed into segments of n bits for M-QAM. In accordance with at least one embodiment, a series of segments of the bits of data is modulated according to QAM to yield a series of constellation points in a QAM constellation as follows:

$$S(t) = d_1(t)\cos 2\pi f_c t + d_2(t)\sin 2\pi f_c t$$

In accordance with at least one embodiment, noise is added to constellation points of a constellation, resulting in a probability distribution of locations of constellation points within the constellation plane. As an example, noise can be added in accordance with a range of signal-to-noise (S/N) ratios to yield corresponding probability distributions.

In accordance with at least one embodiment, demodulation of signal values corresponding to the constellation points with noise added is performed to obtain the data according to which the signal was modulated. Training of the neural networks to classify the noise-shifted constellation points according to the data according to which the signal was modulated provides an ability to determine the data conveyed by a signal when the signal has been affected by noise.

In accordance with at least one embodiment, a neural network on the transmit side of a communication system converts segments of data to be transmitted into signal values corresponding to constellation points of a modulation operation. According to at least one embodiment, instead of a regularly spaced rectilinear array of constellation points, a neural-network-based mapping of segments of data to adaptively located constellation points is performed. As a neural-network-based modulation system can perform deep learning to optimize the locations of constellation points, training of a neural network to implement a neural-network-based modulation system can begin with a constellation of arbitrarily located constellation points. As an example, a training process can begin with a random distribution of points in the constellation plane. The locations of the constellation points can be refined as the deep learning is performed.

In accordance with at least one embodiment, a constellation point in a constellation plane can correspond to complex coordinate values in a complex plane. The complex coordinate values comprise a real value (e.g., corresponding to a location along a real axis of the complex plane) and an imaginary value (e.g., corresponding to a location along an imaginary axis of the complex plane). Thus, a location of a constellation point can be represented by a two-dimensional value. However, a neural-network-based encoder can map the two-dimensional values of constellation points to higher-order dimensions to provide higher-dimensional values to represent the constellation points. For example, additional dimensions can support additional information as may be learned during training of a neural network.

Since noise is typically present in practical communication channels, a neural-network-based decoder can be trained on receive signals influenced by noise. Thus, according to at least one embodiment, noise can be added to a transmit signal to produce a receive signal representative of a receive signal from a communication channel. In accordance with at least one embodiment, the noise-influenced receive signal is mapped to the constellation points representative of the data values of the data being communicated.

As an example, a higher-dimensional signal in the neural-network-based decoder can be mapped to a two-dimensional value representative of a location in a constellation plane. The reduction of dimensions of the values used to represent the information being communicated contributes to the deep learning, as is can compel the neural-network-based decoder extract the proper constellation point corresponding to the segment of data being communicated.

In accordance with at least one embodiment, the training of the neural-network-based decoder is configured to promote accurate reception of the data represented in a receive signal. To guide the neural-network-based decoder training process such that received data obtained from the demodulated signal are exactly similar to the transmitted data, mean-squared error metrics are calculated against received data and transmitted data, in accordance with at least one embodiment, as follows:

$$\min_{y \neq y'} \|y - y'\|_2 > \min_{x \neq x'} \|x - x'\|_2$$

In accordance with at least one embodiment, the training of the neural-network-based encoder, the neural-network-based decoder, or both is configured to assure that energy consumption compares favorably to the amounts of energy used under QAM. In accordance with one embodiment, during the neural network training, if the average power is larger than for QAM, the neural network is penalized to adjust the weighting under which the deep learning occurs to disfavor energy inefficient solutions.

In accordance with at least one embodiment, a neural-network-based encoder, a neural-network-based decoder, or both comprise an autoencoder. An autoencoder can provide unsupervised learning, by which an adaptive efficient modulation system can be configured.

In accordance with at least one embodiment, an orthonormal transformation is performed. As an example, an OVS provides a matrix of orthonormal vector values to be multiplied by output values of a neural-network-based encoder in the case of transmission. As another example, an OVS provides a matrix of orthonormal vector values the transpose of which can be multiplied by a received signal values in the case of reception. As an example, $y=Ax$ where $A=[A_1, \ldots A_{N_{dim}}]$, where $A=[A_1, \ldots A_{N_{dim}}] \in \mathbb{R}^{N \times N_{dim}}$, $x=[x_1, \ldots x_{N_{dim}}]^T \in \mathbb{C}^{N_{dim} \times 1}$ and $y \in \mathbb{C}^{N \times 1}$. Such a relationship can be rewritten as follows:

$$y = \Sigma_{i=1}^{N_{dim}} A_i x_i.$$

where $\forall i$, $\langle A_1, A_i \rangle = 1$ and $\langle A_i, A_j \rangle = 0$ $\forall j \neq i$, with y representing one symbol. Then the distance between two symbols y and y' in the $\mathbb{C}^N$ hyper-cube is as follows:

$$\|y - y'\|_2 = (\langle y - y', y - y' \rangle)^{\frac{1}{2}}$$
$$= \left( \left\langle \sum_{i=1}^{N_{dim}} A_i(x_i - x_i') \sum_{i=1}^{N_{dim}} A_i(x_i - x_i') \right\rangle \right)^{\frac{1}{2}}$$
$$= \left( \sum_{i=1}^{N_{dim}} (x_i - x_i')^2 \langle A_i, A_i \rangle + \sum_{i \neq j} (x_i - x_i')(x_j - x_j') \langle A_j, A_i \rangle \right)^{\frac{1}{2}}$$
$$= \|x - x'\|_2$$

The foregoing shows the distance between two symbols y and y' in the $\mathbb{C}^N$ hyper-cube is the same as the distance between the original strings x and x' in the $\mathbb{C}^{N_{dim}}$ hyper-cube. Given $\forall i$, $x_i$ is equally likely to be $\{-1, +1\}$, the error incurred by maximum likelihood decoding depends on only the distance between the received signal $r=Ax+n$ and the constellation point Ax. Thus, the symbol error rate (SER) can be characterized by the minimum distance between Ax and Ax' for $x \neq x'$. While an orthonormal transformation matrix A, by itself, does not change the distance between x and x', a system implementing neural-network-based modulation can include an orthonormal transformation. Such as system can improve the SER or BER, as will be explained below.

In accordance with at least one embodiment, a neural-network-based encoder can reduce error rates in the communication of data. Given strings x, $x' \in \mathbb{C}^{N_{dim}}$ and corresponding symbols y, $y' \in \mathbb{C}^N$, a transformation $y=f(x)$ is provided such that $$\min_{y \neq y'} \|y - y'\|_2 > \min_{x \neq x'} \|x - x'\|_2,$$

while ensuring that, if $x_i$ is drawn from M-QAM, then the spectral efficiency, SE, of y, $SE(y) \rightarrow \log_2(M)$. If $x_i$ is drawn from M-QAM, then the number of constellation points $|\{i: y_i = Ax_i\}|$ is $M^{N_{dim}}$. Hence, the goal is to find the minimum of $$\binom{M^{N_{dim}}}{2}$$

distances.

In accordance with at least one embodiment, a probability density function (PDF) of the distance between any two symbols, i.e., $f_{d_{ij}}(d_{ij})$ where $d_{ij}=d(x_i,x_j)$, can be considered. If $x_i \in \{-1,1\}^{N_{dim}}$, then $$d_{ij} = \|x_i - x_j\|_2 = \left( \sum_{i=1}^{N_{dim}} 4_{\chi_i} \right)^{\frac{1}{2}},$$

where $\chi_i \sim Be(0.5)$, where Be denotes Bernoulli distribution. As $N_{dim} \rightarrow \infty$, the sum of $N_{dim}$ Bernoulli random variables approaches a Gaussian random variable of mean $$4 \frac{N_{dim}}{2}$$

and variance $$\left( 4 \frac{N_{dim}}{2} \right)^2.$$

Hence, the norm $d_{ij}$ approaches a Rayleigh random variable. A similar analysis can be performed for higher constellations and $d(y_i, y_j)$, both of which can be treated as the norm of the sum of binomial random variables.

In accordance with at least one embodiment, a probability of symbol error can be expressed in terms of a distance between adjacent constellation points $d(y_i, y_j)$, given the flexibility to implement an asymmetrical constellation. The received signal can be denoted by $r=y+n$.

$$P_s = \sum_{m=1}^{M^{N_{dim}}} P(r \text{ decoded incorrectly} \mid M) P(m)$$

-continued $$= 1 - \frac{1}{M^{N_{dim}}} \sum_{m=1}^{M^{N_{dim}}} P(r \text{ decoded correctly} \mid m).$$

In accordance with at least one embodiment, r will be decoded correctly if it lies in the intersection of the half spaces defined by taking each adjacent constellation point and finding the separating hyperplane.

$$P(r \text{ decoded correctly} \mid m) = P\left( r \in \bigcap_{\substack{n=1 \\ n \neq m}}^{M^{N_{dim}}} \|r - y_m\|_2 < \|r - y_n\|_2 \right)$$

$$= P\left( r \in \bigcap_{\substack{n=1 \\ n \neq m}}^{M^{N_{dim}}} \left\langle r - \frac{Y_m + Y_n}{2}, y_m - y_n \right\rangle > 0 \right)$$

Accordingly, $$P_s = 1 - \frac{1}{M^{N_{dim}}} \sum_{m=1}^{M^{N_{dim}}} P\left( r \in \bigcap_{\substack{n=1 \\ n \neq m}}^{M^{N_{dim}}} \left\langle r - \frac{Y_m + Y_n}{2}, y_m - y_n \right\rangle > 0 \right)$$

In accordance with at least one embodiment, through a combination of discrete prolate spheroidal (Slepian) sequences (DPSS) and Fourier waveforms, the SE can be maximized to approach $\log_2(M)$, using values for $N_{dim}$ and N calculated to be optimal. As an example, $x_i$ can be drawn from square M-QAM constellations such that $$x_i = \sqrt{\frac{3}{2(M-1)}} \left( 2m + 1 - \sqrt{M} \right)(1 + j) \text{ for } m = 0, \ldots, \sqrt{M} - 1,$$

and then shown that $N_{burst} \rightarrow \infty$, $\text{vec}(AX) \in \mathbb{C}^{NN_{burst} \times 1}$, where $X = [x_1, \ldots, x_{N_{burst}}] \in \mathbb{C}^{N_{dim} \times N_{burst}}$, has $$BW \rightarrow \frac{N_{dim}}{N},$$

since $SE = \frac{(\log_2 M) \times N_{dim}}{N \times BW}$.

In accordance with at least one embodiment, a value for $N_{dim}$ of 46 and a value for N of 1001 can be used. In accordance with at least one embodiment, a value for $N_{dim}$ between 45 and 47, inclusive can be used. In accordance with at least one embodiment, a value for $N_{dim}$ between 44 and 48, inclusive, can be used. In accordance with at least one embodiment, a value for $N_{dim}$ between 42 and 50, inclusive, can be used. In accordance with at least one embodiment, a value for $N_{dim}$ between 40 and 55, inclusive, can be used. In accordance with at least one embodiment, a value for $N_{dim}$ between 33 and 63, inclusive, can be used. In accordance with at least one embodiment, a value for $N_{dim}$ between any range stated above but excluding 48 can be used. In accordance with at least one embodiment, a value for N between 1000 and 1002, inclusive can be used. In accordance with at least one embodiment, a value for N between 980 and 1022, inclusive can be used. In accordance with at least one embodiment, a value for N between 950 and 1050, inclusive can be used. In accordance with at least one embodiment, a value for N between 900 and 1100, inclusive can be used. In accordance with at least one embodiment, a value for N between 800 and 1200, inclusive can be used. In accordance with at least one embodiment, a value for N between 700 and 1300, inclusive can be used. In accordance with at least one embodiment, a value for N between 600 and 1400, inclusive can be used. In accordance with at least one embodiment, a value for N between 500 and 1500, inclusive can be used.

In accordance with at least one embodiment, a constellation can be established by training an autoencoder that improves BER performance. Such improvement can be provided even when k=n, i.e., when no redundancy or error correcting bits are added.

In accordance with at least one embodiment, training of a neural network can be performed according to a loss function relating a bandwidth occupied by an encoding of a neural-network-based encoder to dimensions of an orthonormal matrix by which the data to be transmitted are multiplied. As an example, the following loss function can be used for training a neural network (e.g., an autoencoder):

$$\mathcal{L}(x, \hat{x}) = (x - \hat{x})^2 + \left( BW(vec(f(Ax))) - \frac{N_{dim}}{N} \right)^2,$$

where BW denotes a bandwidth.

In accordance with at least one embodiment, wherever $\mathbb{C}$ has been given as input to a neural network, the real and imaginary components of complex values may be stacked. To add AWGN, a noise layer may be provided either as a simulation based on random (e.g., pseudorandom) data, which may be shaped (e.g., filtered), or as an actual communication channel. As an example of how the characteristics of a noise layer may be shaped, a raised-root cosine (RRC) low-pass filter (LPF) may be used. To implement a RRC LPF, a Lambda layer may be used, with its implementation ensured to be differentiable. While the use of a DPSS-Fourier A matrix by which to multiply the data to be transmitted (e.g., x) can ensure the absence of high-frequency components in the time-domain signal, the same does not necessarily hold for the output of a transmitter neural network given by $f(Ax)$, so shaping (e.g., filtering) of such output can be provided.

In accordance with at least one embodiment, a method comprises mapping, in a first artificial neural network, a plurality of data values to a plurality of constellation points; adding noise to the constellation points to obtain a plurality of noise-added constellation points; mapping, in a second artificial neural network, the plurality of noise-added constellation points to a plurality of data value representations; and applying the plurality of data value representations to perform a communication operation selected from a group consisting of modulating transmit data in a transmitter and demodulating a receive signal in a receiver. In accordance with at least one embodiment, the method further comprises applying an energy consumption penalty to the first artificial neural network. In accordance with at least one embodiment, the method further comprises applying an energy consumption penalty to the second artificial neural network. In accordance with at least one embodiment, the method further comprises maintaining fidelity of the plurality of data value representations to the plurality of data values according to mean squared error bounds. In accordance with at least one embodiment, the plurality of data values each comprise an in-phase (I) component and a quadrature (Q) component. In accordance with at least one embodiment, the plurality of constellation points are a plurality of quadrature-amplitude-modulation (QAM) constellation points. In accordance with at least one embodiment, the plurality of data value representations describe regions in a plane of in-phase (I) component values and of quadrature (Q) component values.

In accordance with at least one embodiment, an apparatus comprises a data input; a quadrature-amplitude-modulation (QAM) modulator configured to receive a plurality of data values via the data input; a neural-network-based encoder configured to receive a plurality of QAM constellation points from the QAM modulator and to provide a plurality of modified constellation points; and an orthonormal-vector-set (OVS) mapper configured to receive the plurality of modified constellation points and to provide a multi-dimensional mapping of the plurality of modified constellation points. In accordance with at least one embodiment, the neural-network-based encoder further comprises a first encoder neural-network-based mapper; and a second encoder neural-network-based mapper. In accordance with at least one embodiment, the neural-network-based encoder further comprises a first encoder hyperbolic tangent activation block; and a second encoder hyperbolic tangent activation block. In accordance with at least one embodiment, the neural-network-based encoder further comprises a first encoder bias block; and a second encoder bias block. In accordance with at least one embodiment, the apparatus further comprises a noise-adding block coupled to the OVS mapper and configured to receive the multi-dimensional mapping of the plurality of modified constellation points and to add noise to the multi-dimensional mapping. In accordance with at least one embodiment, the apparatus further comprises an orthonormal-vector-set (OVS) de-mapper configured to receive a signal from the noise-adding block and to provide a plurality of receive constellation points. In accordance with at least one embodiment, the apparatus further comprises a neural-network-based decoder configured to receive the plurality of receive constellation points and to provide a plurality of receive QAM constellation points.

In accordance with at least one embodiment, an apparatus comprises an orthonormal-vector-set (OVS) de-mapper configured to receive a signal and to provide a plurality of constellation points; a neural-network-based decoder configured to receive the plurality of constellation points and to provide a plurality of QAM constellation points; a quadrature-amplitude-modulation (QAM) demodulator configured to receive the plurality of QAM constellation points and to provide received data; and a data output configured to convey the received data. In accordance with at least one embodiment, the neural-network-based decoder further comprises a first decoder neural-network-based mapper; and a second decoder neural-network-based mapper. In accordance with at least one embodiment, the neural-network-based decoder further comprises a first decoder hyperbolic tangent activation block; and a second decoder hyperbolic tangent activation block. In accordance with at least one embodiment, the neural-network-based decoder further comprises a first decoder bias block; and a second decoder bias block. In accordance with at least one embodiment, the apparatus further comprises a noise-adding block coupled to the OVS mapper and configured to receive a multi-dimensional mapping of a plurality of modified constellation points and to add noise to the multi-dimensional mapping. In accordance with at least one embodiment, the apparatus further comprises an orthonormal-vector-set (OVS) mapper configured to receive the plurality of modified constellation points and to provide the multi-dimensional mapping of the plurality of modified constellation points.

Punctuation used herein may vary in accordance with grammatical usage. As an example, an adjective may precede a noun without a hyphen in some instances, while one or more adjectives and a noun, used as an adjectival phrase, may be hyphenated. Accordingly, the mere presence or absence of a hyphen or other punctuation mark should not be inferred to denote a distinct element. However, an adjectival phrase, hyphenated or not, may be used in the identification or description of multiple elements.

The concepts of the present disclosure have been described above with reference to specific embodiments. However, one of ordinary skill in the art will appreciate that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A method comprising:

mapping, in a first artificial neural network, a plurality of data values to a plurality of constellation points;

adding noise to the constellation points to obtain a plurality of noise-added constellation points;

mapping, in a second artificial neural network, the plurality of noise-added constellation points to a plurality of data value representations; and applying the plurality of data value representations to perform a communication operation selected from a group consisting of modulating transmit data in a transmitter and demodulating a receive signal in a receiver.

2. The method of claim 1 further comprising:

applying an energy consumption penalty to the first artificial neural network.

3. The method of claim 1 further comprising:

applying an energy consumption penalty to the second artificial neural network.

4. The method of claim 1 further comprising:

maintaining fidelity of the plurality of data value representations to the plurality of data values according to mean squared error bounds.

5. The method of claim 1 wherein the plurality of data values each comprise an in-phase (I) component and a quadrature (Q) component.

6. The method of claim 1 wherein the plurality of constellation points are a plurality of quadrature-amplitude-modulation (QAM) constellation points.

7. The method of claim 1 wherein the plurality of data value representations describe regions in a plane of in-phase (I) component values and of quadrature (Q) component values.

* * * * *